Figure 1:
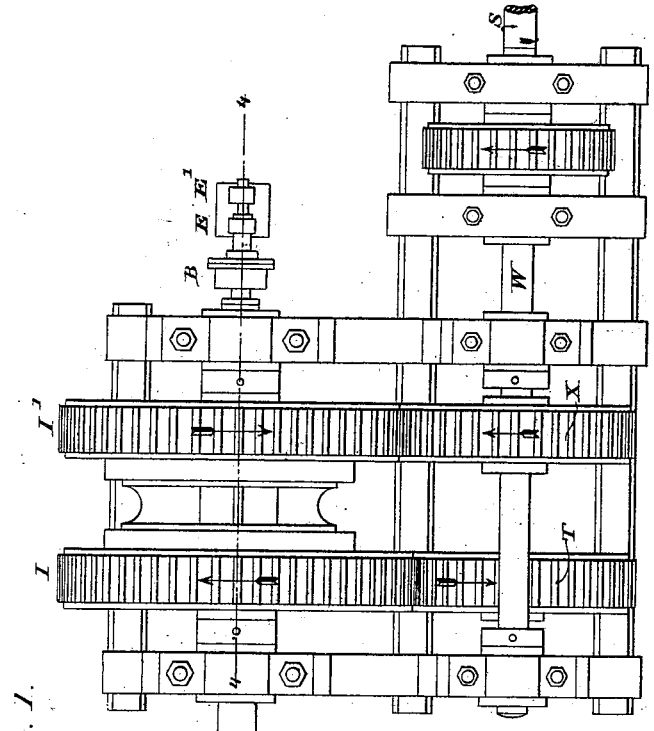

(No Model.) 4 Sheets—Sheet 1.

T. A. WESTON.
MECHANISM FOR REVERSING ROLLING MILLS.

No. 304,479. Patented Sept. 2, 1884.

WITNESSES
Wm A. Skinkle
Alfred C. Newman.

INVENTOR
Thomas A. Weston
By his Attorneys
Baldwin, Hopkins & Peyton.

(No Model.)  4 Sheets—Sheet 2.

T. A. WESTON.
MECHANISM FOR REVERSING ROLLING MILLS.

No. 304,479. Patented Sept. 2, 1884.

WITNESSES
Wm A. Skinkle
Alfred C. Newman.

INVENTOR
Thomas A. Weston
By his Attorneys
Baldwin, Hopkins & Peyton (No Model.) 4 Sheets—Sheet 3.
T. A. WESTON.
MECHANISM FOR REVERSING ROLLING MILLS.
No. 304,479. Patented Sept. 2, 1884.

WITNESSES
Wm A. Skinkle
Alfred E. Newman.

INVENTOR
Thomas A. Weston
By his Attorneys
Baldwin Hopkins & Peyton (No Model.) 4 Sheets—Sheet 4.

T. A. WESTON.
MECHANISM FOR REVERSING ROLLING MILLS.

No. 304,479. Patented Sept. 2, 1884.

WITNESSES
Wm A. Skinkle
Alfred C. Newman.

INVENTOR
Thomas A. Weston
By his Attorneys
Baldwin, Hopkins & Peyton

UNITED STATES PATENT OFFICE.

THOMAS A. WESTON, OF STAMFORD, CONNECTICUT, ASSIGNOR TO THE YALE & TOWNE MANUFACTURING COMPANY, OF SAME PLACE.

MECHANISM FOR REVERSING ROLLING-MILLS.

SPECIFICATION forming part of Letters Patent No. 304,479, dated September 2, 1884.

Application filed May 29, 1883. (No model.)

*To all whom it may concern:*

Be it known that I, THOMAS A. WESTON, of Stamford, Connecticut, have invented certain new and useful Improvements in Mechanism for Reversing Rolling-Mills, of which the following is a specification, reference being had to the accompanying drawings.

My invention has for its object the reversing of the rolls of rolling-mills used in the manufacture of blooms, ingots, railway-rails, plates, sheets, or other rolled metallic forms; but it is also in part otherwise applicable, especially where heavy, powerful, and durable frictional driving and reversing or braking gear is required.

Prior to the date of my invention several systems of clutch-reversed rolls for rolling rails, bars, and plates were tried with more or less dissatisfaction. The clutch first employed as one of the required elements in reversing such rolls was the well-known "forked" or "claw" clutch, sometimes appropriately called a "slap-bang" clutch. Its concussions and breakages induced the attempted use of various frictional devices, some operated by hydraulic pressure, none of which, however, have been permanently adopted in practice. The uniform ill success of all clutch-operated heavy reversible rolls has caused their general disuse and the substitution of the American system of "three-high" rolls and ordinary fly-wheel engines, or the English system of "reversing" engines without fly-wheel, in which the engines are reversed along with all the connected gearing, in order to reverse the rolls. In the latter system, although the advantages of reversible rolls are partially secured, there is an excessive waste of steam, because the absence of a fly-wheel necessitates maximum power to be constantly expended, even for minimum resistances, with the attendant evil of variable speed in the rolls, and a consequent tendency to irregularity and want of homogeneousness in the rolled products. To the three-high system of rolls great objection exists in the increased outlay for the larger number of rolls used; also, in the necessity for lifting the bloom or bar from the bottom to the top roll and of receiving it from the rolls at different levels. A further objection thereto, in the opinion of many operators of plate-mills—which has resulted in the expensive use of reversible engines, as above stated—is that a better contexture of surface in a rolled plate or sheet is obtained by the "back-and-forth" action thereon of reversible rolls.

In previous systems of frictionally-reversed rolls the frictional devices employed were by their own inherent mechanical limitations restricted to comparatively small and insufficient areas in their frictional surfaces—as, for example, appears by the English Patent No. 2,654 of 1871.

To seize a rolling-mill train at full speed by a frictional grip and reverse its motion abruptly and often is the first duty required in a clutch for reversible rolls. Such intense frictional action involves the rapid translation of many units of mechanical force back into the equivalent in units of heat, and the equally rapid diffusion of this constantly-developed heat is the next requirement and a necessity. With friction areas in extent only a fraction of what was needed, the frictional devices in prior systems required enormous initial pressure to hold the surfaces in contact, and generally performed the brake duty by abrasion of their surfaces, and that of driving by the fine interlocking engagement of their abraded faces, while cooling off could be effected only by stopping the mill. Besides these defects, the sudden action of the great power employed to bring two solid frictional surfaces into engagement produces injurious concussion. The result has been the uniform disuse of such frictional devices beyond a first trial.

In view of the foregoing elemental conditions of satisfactory working brake and reversing mechanism for heavy rolls, and in view of the defects of existing brake and reversing mechanism above recited, my invention has for its object to secure economical, reliable, and perfect frictional braking and reversing action without percussion like that of the slap-bang clutch, and the ordinary frictional reversing mechanism for rolling-mills without the waste of power and variable speed resulting from the employment of reversing engines, without the necessity of great initial pressure for parts in frictional contact, and without the abrasion and rapid destruction of such parts.

Accordingly my invention, stated in general terms, consists in the combination of the frictional disk brake and coupling—patented to me in the United States March 3, 1868, No. 75,227—with the rolls and gears of a rolling-mill by the aid of such novel mechanical modifications and constructive adaptations of parts as are hereinafter described in detail by reference to the accompanying drawings, in which—

Figure 6:
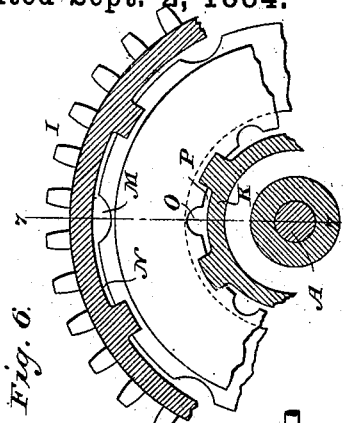
Figure 7:
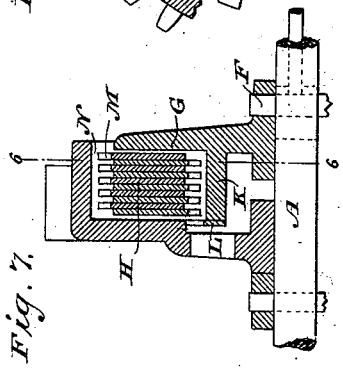
Figure 5:
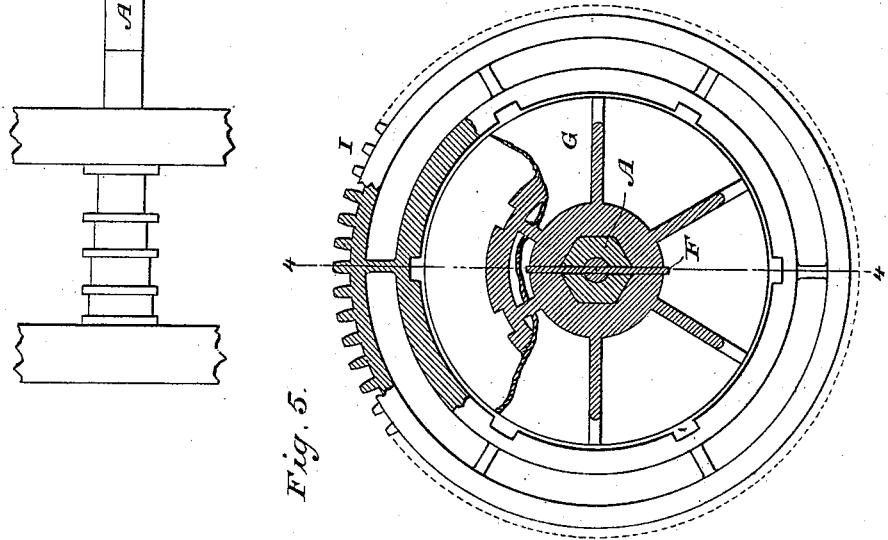
Figure 3:
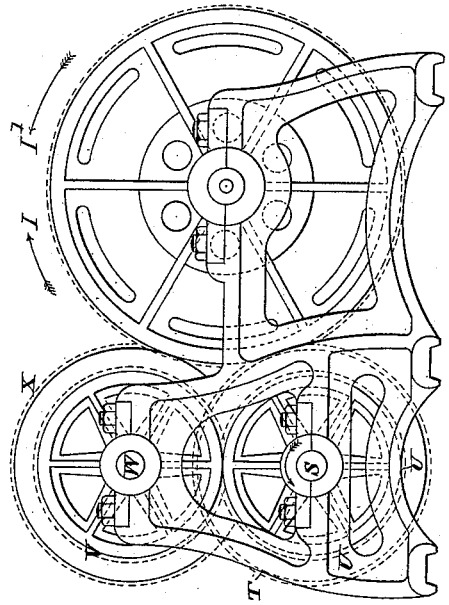
Figure 2:
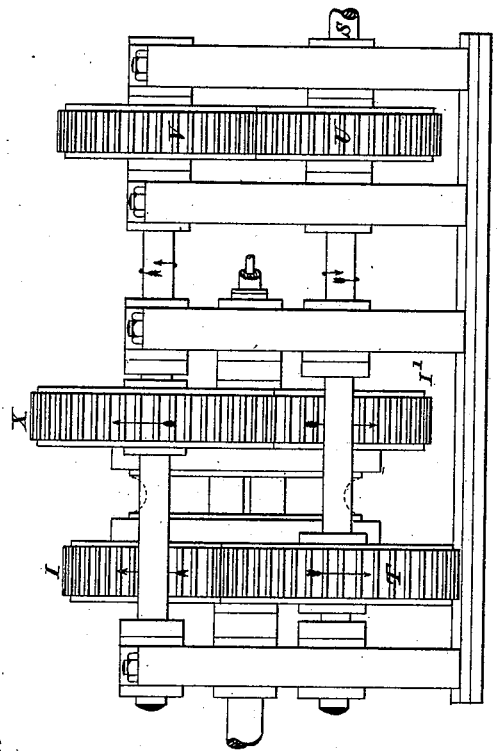
Figure 4:
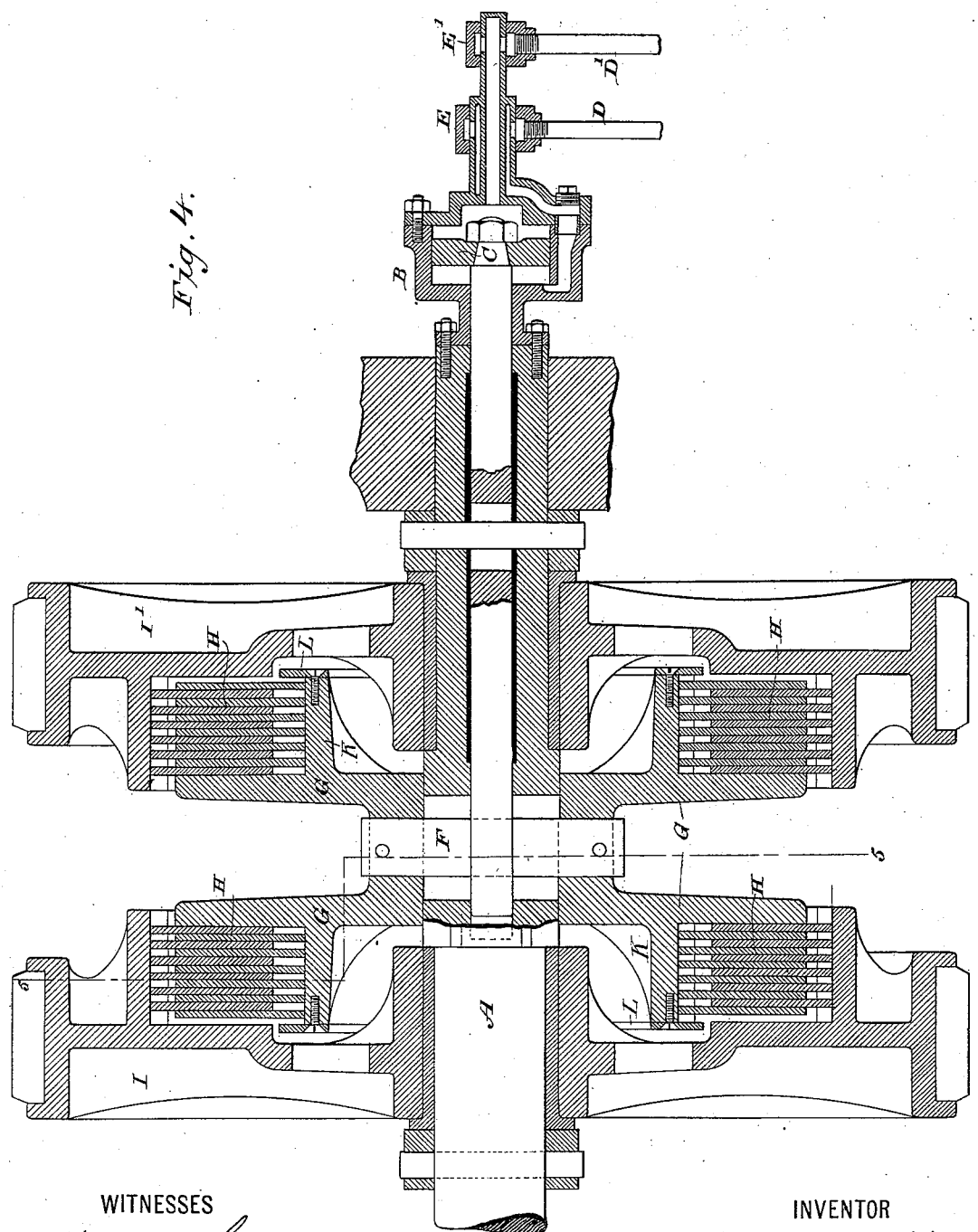

Figure 1 is a top or plan view of a rolling-mill embodying my invention. Fig. 2 is a side elevation of the same, omitting the rolls. Fig. 3 is an end elevation. Fig. 4 is an enlarged vertical section showing the clutch-shaft and clutches. Fig. 5 is an elevation partly in section on the line 5 5 of Fig. 4. Fig. 6 is a sectional view through a part of a disk-clutch, showing water-passages through the disks drawn on the line 6 6 of Fig. 7. Fig. 7 is a view on the line 7 7 of Fig. 6.

I employ the ordinary heavy rolls and housings, which I need not describe, further than to say that the rolls are driven, as usual, by the main clutch-shaft A, and are reversed with it.

S indicates the main driving-shaft, which rotates continuously in the direction of the arrow, and carries the spur-wheel T, which gears with one of the clutch-wheels, I, loose upon the clutch-shaft A, and rotates it constantly in the direction of its arrow. The driving-shaft S also carries the spur-wheel U, which gears with the spur-wheel V on the shaft W, which in turn carries the spur-wheel X, gearing with the other clutch-wheel, I', also loose upon the clutch-shaft, and rotates it constantly in the direction of its arrow, oppositely to the other clutch-wheel.

I operate the friction brake and clutch mechanism by means of hydraulic, steam, or other fluid pressure, as is well understood and contemplated, for example, in the above-mentioned English Patent No. 2,654 of 1871.

I provide the revolving clutch-shaft A at its outer end with a pressure-cylinder, B, containing a double-acting piston, C, of usual form, to which any convenient fluid-pressure—such as that of steam or water—is admitted through supply and discharge pipes D and D', centrally connected with the said revolving pressure-cylinder by suitable stuffing boxes or glands, E E'. The piston-rod passes centrally within and along the shaft A to a cross-bar, F, whereby the motion and force of the piston is applied to the connected sliding pressure-plates G, preferably cast together in one piece, which compress my frictional disks H, and thus frictionally unite them and their connected clutch-wheels I alternately to the shaft, the clutch-wheels having annular recesses or friction-boxes in their sides, as illustrated. The simple cessation or withdrawal of the fluid-pressure from the piston leaves my disks unloaded, and consequently uncoupled; and the reversal of the pressure transfers the braking and clutching action from one set of disks to the other. The fluid-pressure may be derived from an accumulator or other convenient source under the regulation of valves in the ordinary manner.

It will be observed that the pressure-plates G are each provided with a disk-carrying hub, K, and guard-ring L, for retaining the disks in place on the hub when released from pressure. These rings also serve to pull the disks longitudinally upon their keys, thereby hastening their release from each other and the disengagement of the spur-wheels I from the shaft A.

One single-acting piston may be placed at each end of the clutch-shaft and both pistons united by a common piston-rod to the cross-bar F and double pressure-plate G. In this arrangement the fluid-pressure is admitted to each cylinder alternately for alternately clutching and releasing either clutch-wheel.

Figure 8:
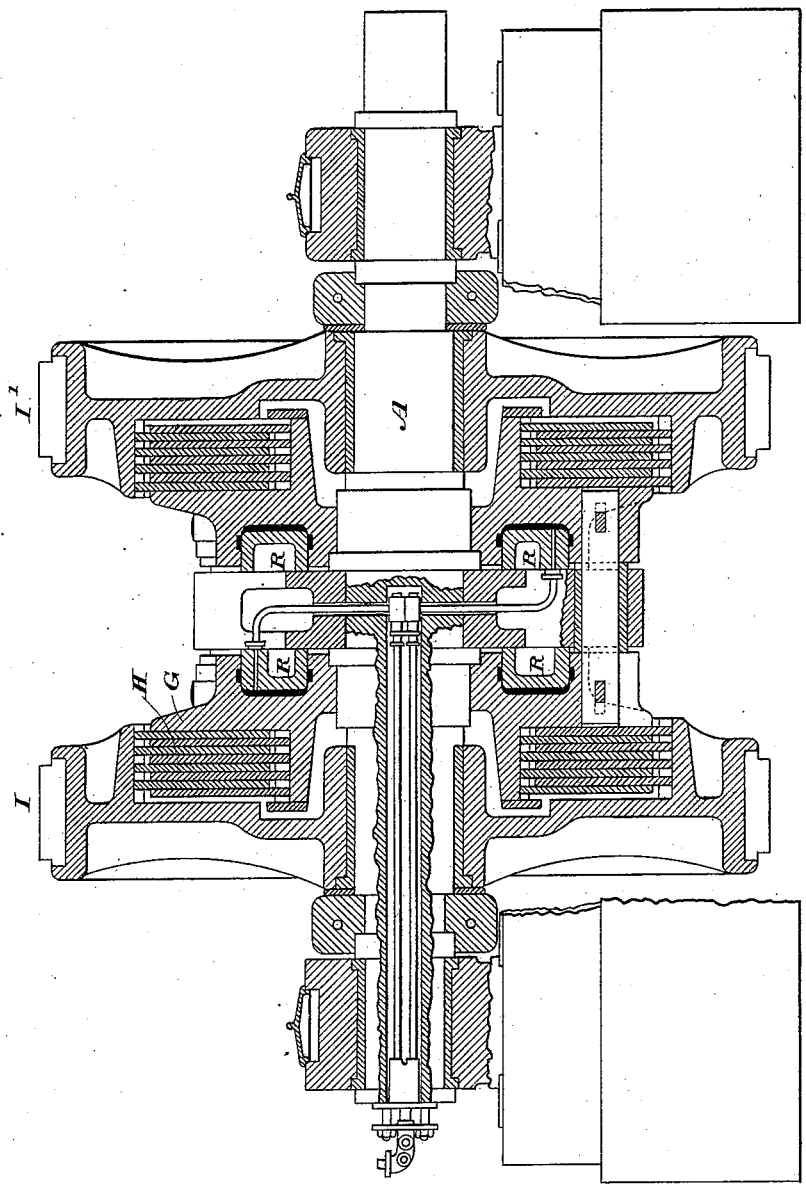

In lieu of a central piston rod or bar on the axial line of the clutch-shaft, I may employ two or more sliding bars or keys, sunk longitudinally in the surface of said shaft, or placed in longitudinal holes near the said surface, and by preference arranged concentrically to to the shaft and equidistant from each other. If desired, the piston-rod may be dispensed with altogether, and the fluid carried by pipes into cylinders and against pistons R, connected directly with the double pressure-plate G, so that the fluid itself will act directly upon the plates G, as illustrated in Fig. 8.

In a working mill having in each clutch twelve pairs of frictional disks six and a half feet in diameter, a total disk-area of upward of seventy thousand square inches is secured. This extent of surface is made additionally effective as a heat-diffuser of that area by means of the cold-water circulation which I provide. The cooling process occurs, mainly, during the idle moments of each brake-clutch when its disks are running contrarily to each other, and are separated or slightly spaced apart, thus exposing freely all their surfaces to the air and water currents, for the entrance, diffusion, and escape of which the parts are constructed, as best shown in Figs. 6 and 7, where M indicates a cut-away portion of the disks, and N an annular space between the peripheries of the disks and the interior of the clutch-wheel I, for the admission of air and water.

O indicates other cut-away portions of the disks, and P spaces between the inner margins of the disks and the hubs K.

The water can be supplied from pipes or hose conveniently located, which are not illustrated in the drawings, and it will discharge through the various openings in the mechanism. The water-current, in removing continually the required heat of friction, also removes all dust, cinder, or other matter tending to undue wear, and serves as a lubricator. Oil or any other lubricant may also be used, as the extensive surfaces of the disks yield a large total frictional effect for breaking or for driving, even with the low frictional coefficient due to lubrication and a low initial pressure. Their reduction by wear is thus made very gradual, and their renewal, when it is required, is easy and at the minimum cost, owing to their simple form.

It will now be clearly perceived that in addition to the immense frictional wear and perfect heat diffusion realized in my invention it presents also immunity from the hammer and anvil percussion of a powerful hydraulic ram upon a single dead surface, such as occurs in other forms of reversing-gear, wherein the clutch consists of a single face either flat or conical. The small area for friction of the latter forms requires a hydraulic cylinder of enormous power to effect the initial coupling-pressure, the sudden intensity of which, acting upon the dead mass of clutch wheels and shaft, tends to their crystallization, fracture, and displacement; to rapid wear upon the shaft-collars, and breakage of teeth. In my invention the pressure of the small hydraulic cylinder is received upon the line of loose and separated disks, which close up under it with a bellows-like or air-spring action, as first the air, then the surplus water is expelled from between their many faces. The seizing action of all the disks is thus slightly delayed or graduated, softening the first impact of the driving-power upon the parts reversed, while securing promptness and certainty of action in the clutches both in driving and releasing, and economizing every instant of time in working the rolled piece when it is hottest and most plastic, thus saving power and promoting quick, uniform, and continuous work.

Having made the following combinations the subject of a division of this application, I do not claim them herein, to wit: first, in combination with the rolls, clutch-shaft A, and loose reversing clutch-wheels I of a rolling-mill, two Weston friction-disk clutches, pressure-plates, piston-rod, and operating fluid-pressure cylinder, substantially as and for the purpose described; second, the combination of a clutch-wheel, I, a Weston friction-disk clutch, and a single pressure-plate, G, piston-rod and cylinder for operating the same, substantially as described; third, the combination of a clutch-wheel, I, a Weston friction-disk clutch, and a pressure-plate, G, provided with hub K and guard-ring L, substantially as described; fourth, the combination of a clutch-wheel, I, a Weston friction-disk clutch provided with notches or cut-away portions N and O for the circulation of air and water, substantially as described.

Having thus described my invention, what I claim herein as new, and desire to secure by Letters Patent, is—

The combination of a clutch-shaft having a central bore and carrying a loose wheel with a friction-box in one of its sides, a fluid-pressure cylinder fixed to and revolving with one end of said shaft, and provided with a fixed pipe for supplying and discharging the fluid-pressure, a piston within said cylinder, a rod arranged within the central bore of the clutch-shaft and attached to the piston, a cross-head centrally connected with said rod and extending through longitudinal slots in the clutch-shaft, in which slots the cross-head slides, and an annular disk or plate connected to the cross-head, to which plate a longitudinal sliding motion is imparted by the action of the piston-rod and cross-head, substantially as set forth.

In testimony whereof I have hereunto subscribed my name this 22d day of May, A. D. 1883.

THOS. A. WESTON.

Witnesses:
E. C. DAVIDSON,
JAMES YOUNG.